United States Patent
Hognaland

(10) Patent No.: US 11,821,673 B2
(45) Date of Patent: Nov. 21, 2023

(54) COOLED STORAGE SYSTEM HAVING SECTIONS SEPARATED BY THERMAL BARRIER

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/823,717

(22) Filed: Aug. 31, 2022

(65) Prior Publication Data

US 2022/0412636 A1 Dec. 29, 2022

Related U.S. Application Data

(63) Continuation of application No. 16/874,701, filed on May 15, 2020, now Pat. No. 11,466,923, which is a (Continued)

(30) Foreign Application Priority Data

Feb. 19, 2014 (NO) .................................. 20140216

(51) Int. Cl.
*F25D 13/04* (2006.01)
*B65G 1/04* (2006.01)
(Continued)

(52) U.S. Cl.
CPC ............... *F25D 13/04* (2013.01); *B65G 1/02* (2013.01); *B65G 1/0464* (2013.01); *F25D 25/04* (2013.01); *F25D 2201/10* (2013.01)

(58) Field of Classification Search
CPC ...... F25D 13/04; F25D 25/04; F25D 2201/10; B65G 1/02; B65G 1/0464
See application file for complete search history.

(56) References Cited

U.S. PATENT DOCUMENTS 2,165,513 A 7/1939 Smith
3,203,199 A * 8/1965 Stewart ................. F25B 39/024
62/414
(Continued)

FOREIGN PATENT DOCUMENTS

CN 101553398 A 10/2009
CN 101553416 A 10/2009
(Continued)

OTHER PUBLICATIONS

Search Report of Georgian National IP Centre, cited inter alia as statement of relevence for non-english references cited herein.
(Continued)

*Primary Examiner* — Elizabeth J Martin
(74) *Attorney, Agent, or Firm* — Osha Bergman Watanabe & Burton LLP

(57) ABSTRACT

A storage system includes a grid structure of storage cells. Each storage cell is arranged to accommodate a vertical stack of storage bins and having a top level. The grid structure includes a plurality of vertical aluminum columns interconnected by top rails. The columns form adjacent rows of storage cells. The storage system includes at least one remotely operated vehicle arranged to move on the top rails and receive a storage bin from a storage cell at the top level of the grid structure. The storage system includes an insulated cover covering at least one of the storage cells at the top level.

19 Claims, 5 Drawing Sheets

Related U.S. Application Data continuation of application No. 15/860,699, filed on Jan. 3, 2018, now Pat. No. 10,697,688, which is a continuation of application No. 15/118,495, filed as application No. PCT/EP2015/053390 on Feb. 18, 2015, now Pat. No. 10,018,397.

(51) Int. Cl.
   *B65G 1/02* (2006.01)
   *F25D 25/04* (2006.01)

(56) References Cited

U.S. PATENT DOCUMENTS

| | | | |
|---|---|---|---|
| 4,043,463 A | | 8/1977 | Hansen |
| 4,063,432 A | | 12/1977 | Chaussy et al. |
| 4,088,232 A | | 5/1978 | Lilly |
| 4,599,871 A | * | 7/1986 | Fredrixon ............... F25D 13/04 62/378 |
| 6,694,767 B2 | | 2/2004 | Junca et al. |
| 9,310,119 B2 | | 4/2016 | Fuhr et al. |
| 2012/0272500 A1 | * | 11/2012 | Reuteler ............. B65G 1/0464 414/277 |
| 2015/0307276 A1 | * | 10/2015 | Hognaland ............... B66F 9/06 700/218 |

FOREIGN PATENT DOCUMENTS

| | | |
|---|---|---|
| GE | P20156407 B | 12/2015 |
| WO | 8500422 A1 | 1/1985 |
| WO | 9849075 A1 | 11/1998 |
| WO | 2013167907 A1 | 11/2013 |
| WO | 2017121512 A1 | 7/2017 |

OTHER PUBLICATIONS

Bill LEber & Matt Wulfraat, "Autostore: Perfect Combination of High Density Storage and Efficient Collection", Technology & Enterprise Update: 2013 Statement of Relevence: Shows the Autostore grid storage system discussed as prior art in the application.

* cited by examiner

COOLED STORAGE SYSTEM HAVING SECTIONS SEPARATED BY THERMAL BARRIER

CROSS REFERENCE TO RELATED APPLICATIONS

The present application is a continuation application of and, thereby, claims benefit under 35 U.S.C. § 120 to U.S. patent application Ser. No. 16/874,701 filed May 15, 2020, which is a continuation of U.S. patent application Ser. No. 15/860,699 filed Jan. 3, 2018, which is a continuation of U.S. patent application Ser. No. 15/118,495 filed Aug. 12, 2016, which is a U.S. National Stage of international application PCT/EP2015/053390 filed Feb. 18, 2015, which claims foreign priority to Norwegian Patent Application No. NO 20140216 filed Feb. 19, 2014.

TECHNICAL FIELD

The present invention relates to the technical field of logistics and storage systems.

More specifically the invention relates to a storage system for receiving and storing processed refrigerated and frozen food products waiting to be shipped to the marketplace, which comprises a first grid structure of storage cells, each storage cell being arranged to accommodate a vertical stack of storage bins, the first grid structure having a top level. The system further comprises a first vehicle, arranged to move horizontally at the top level of the first grid structure, and a bin lift device, arranged to convey a bin in a vertical direction between the top level of the grid structure and a delivery station. There is provided thermal insulation between at least a section of the grid structure and the remotely operated vehicle, and said section of the grid structure has a temperature that is lower than the temperature of the remotely operated vehicle. The vehicle is further arranged to receive a storage bin from a storage cell at the top level of the first grid structure and to deliver the storage bin to the bin lift device. Moreover, the bin lift device is arranged to receive a bin from the vehicle at the top level of the first grid structure and to convey the bin to the delivery station.

BACKGROUND

The Applicant's already known AutoStore system is a storage system of the type mentioned in the introduction. The AutoStore system comprising a three-dimensional storage grid containing storage bins that are stacked on top of each other to a certain height. The storage grid is constructed as aluminium columns interconnected by top rails. A number of vehicles, or robots, are arranged on the top rails. Each vehicle is equipped with a lift for picking up, carrying, and placing bins that are stored in the storage grid.

Such a storage system of the background art has been illustrated in FIG. 1. The storage system 10 comprises a grid structure 20 of storage cells. Each cell is arranged to accommodate a vertical stack of storage bins 30. The grid structure has a top level.

The storage system 10 further comprises a vehicle 40, which is arranged to move at the top level of the grid structure and also arranged to receive a bin from a storage cell at the top level of the grid structure. The storage system 10 may include a plurality of such vehicles 40, as illustrated.

The storage system 10 further comprises a bin lift device 50. The bin lift device 50 is arranged to receive a bin from the first vehicle 40 at the top level of the first grid structure and to convey the bin down in a vertical direction to a delivery station, or port, 60. The storage system 10 may include a plurality of such lift devices 50 and ports 60, as illustrated. Todays households rely on the availability of foodstuffs that can be purchased in a refrigerated or frozen state. Between the time the food is processed and the time it reaches the marketplace, the processed food may be held in a distributor's warehouse under strictly controlled temperatures. In order to minimize the time between storage and delivery, it is a need for efficient logistic systems which can access and deliver the correct food in a minimum of time.

U.S. Pat. No. 2,165,513 describes a cold storage locker room, where the stored goods are manually retrieved.

U.S. 2012272500 describes a storage for storing sample containers in stacks in a low temperature sample store. The low temperature sample store is equipped with a robot suspended above the storage stack for removing and inserting stacks into the storage.

These cooled storages, however, do not have the possibility of easily retrieving the correct container, and the time between storage and delivery would not be acceptable.

One or more embodiments of the invention provide a cooled storage system, which maintains the advantages of prior art logistic systems while providing storage for cooled products.

The invention has been defined in the patent claims.

In one embodiment of the invention a cooled storage system comprises a grid structure of storage cells, where each cell is arranged to accommodate a vertical stack of storage bins and having a top level, at least one remotely operated vehicle arranged to move at the top level of the grid structure and receive a bin from a storage cell at the top level of the grid structure, where there is provided thermal insulation between at least a section of the grid structure and the remotely operated vehicle, and said section of the grid structure has a temperature that is lower than the temperature of the remotely operated vehicle.

The storage system has in one embodiment a general design as outlined in FIG. 1. The products to be stored are arranged in storage bins, which are arranged in the stacks of the storage system. The remotely operated vehicle is adapted for picking up storage bins from the storage system and comprises in one embodiment a vehicle body comprising a first section for storing vehicle driving means and a second section for receiving any storage bin stored in a stack within the storage system, a vehicle lifting device at least indirectly connected to the vehicle body for lifting the storage bin into the second section, a first set of vehicle rolling means connected to the vehicle body allowing movement of the vehicle along a first direction within the storage system during use and a second set of vehicle rolling means connected to the vehicle body allowing movement of the vehicle along a second direction in the storage system (3) during use, the second direction being perpendicular to the first direction.

In one embodiment the grid structure with associated vertical stacks of storage bins, is sub-divided into a number of sections, for example two, three or more sections. The sections are separated from each other by thermal insulation such as polystyrene, insulating boards or plates, insulating mats, or other suitable insulating material. The thermal insulation constitutes a wall or thermal barrier between the sections of the grid structure, and gives the opportunity of having different temperature in the different sections of the grid structure. In one embodiment at least one of the sections is connected to a cooling unit, thus providing a cooler temperature in this/these sections.

In one embodiment the cooling unit is an evaporator. An evaporator is in this context a device which is used in an air-conditioning system to allow a compressed cooling chemical to evaporate from liquid to gas while absorbing heat in the process. The cooling chemical can for example be R-22 (Freon) or R-410A, or other suitable chemical.

The cooled storage system can further comprise a bin lift device arranged to receive a bin from a vehicle at the top level of the first grid structure and to convey the bin down in a vertical direction to a delivery station, or port. Here the content of the bin can be collected, or the complete bin may be transported to its destination.

In one embodiment the system comprises insulating covers arranged in the top level of the grid structure. The insulating covers provide a thermal barrier towards the remotely operated vehicle as well as contributing to maintaining the desired temperature in the bins in the grid structure. The insulating covers are arranged to be movable by means of the remotely operated vehicle. The vehicle can move one insulating cover to another cell in the grid, or hold it temporarily while a bin is removed from the stack.

Further possible features, including exemplary aspects, structure and operation of various embodiments, have been described in detail below with reference to the accompanying drawings. In the drawings, like reference numbers indicate identical or functionally similar elements.

DETAILED DESCRIPTION

Figure 1:
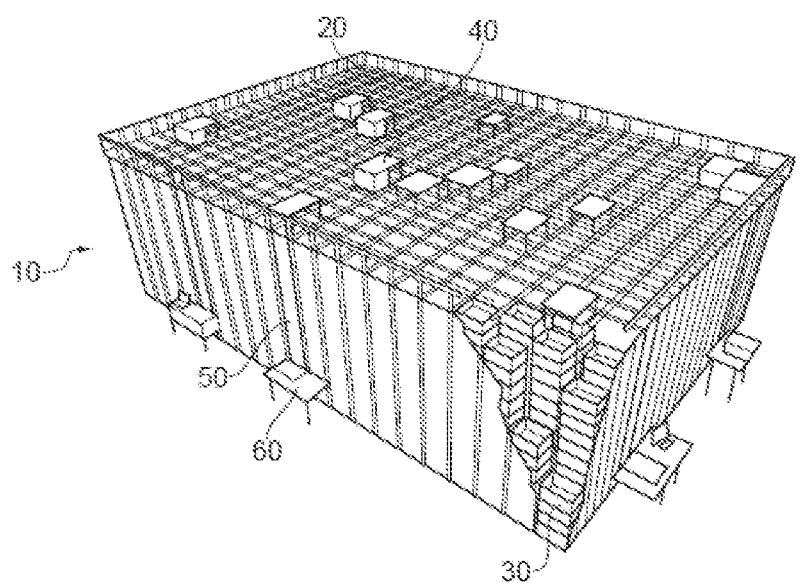
FIG. 1 is a schematic, partly cut perspective view of a storage system according to the background art.

FIG. 1 is a schematic, partly cut perspective view of a storage system according to the background art, which has already been referred to in the background section.

Figure 2:
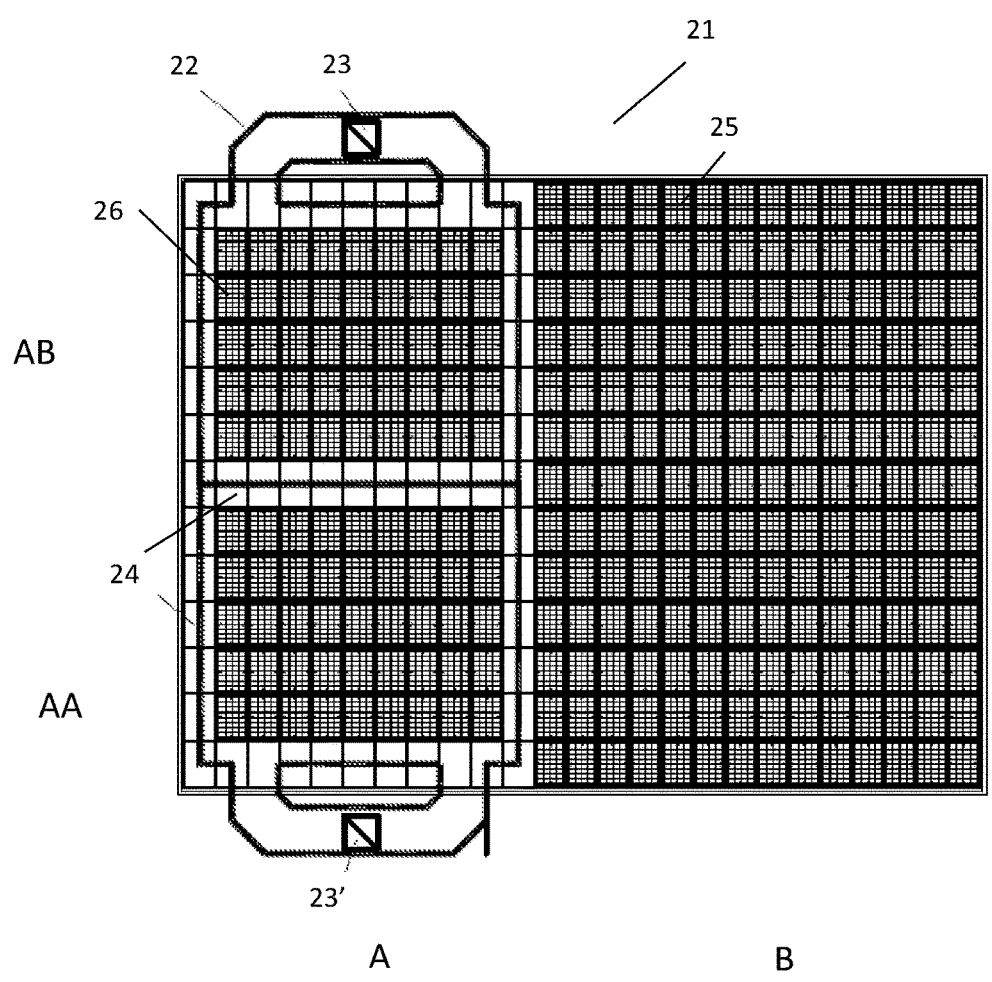
FIG. 2 is a schematic top view illustrating certain aspects of a storage system.
Figure 3:
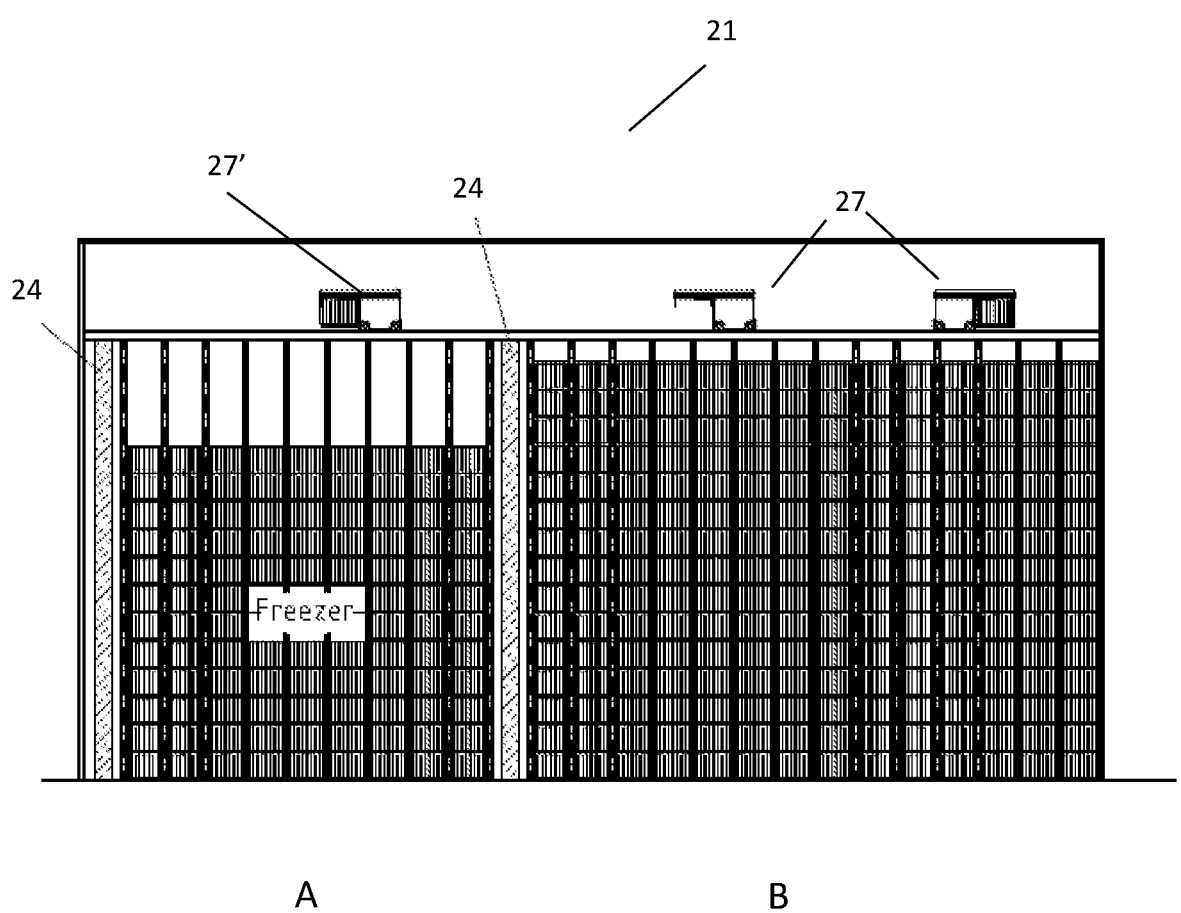
FIG. 3 is a schematic side view of the storage system in FIG. 2.
Figure 4:
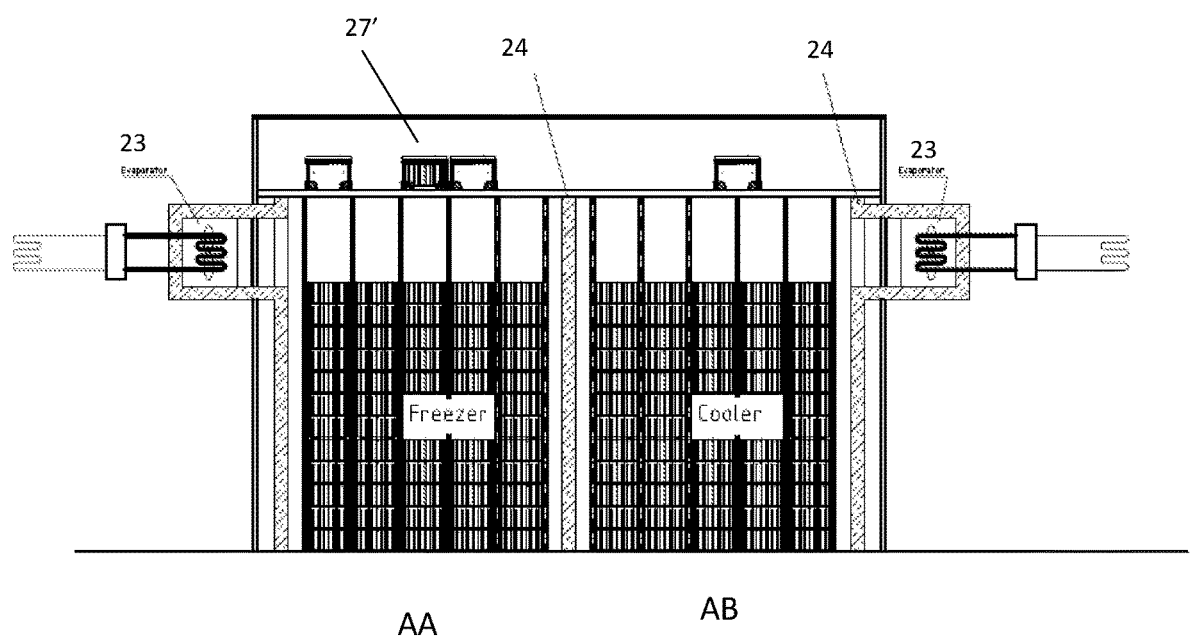
FIG. 4 is a schematic side view of the storage system in FIG. 2.

FIGS. 2, 3 and 4 is a schematic top view and side view illustrating certain aspects of a storage system 21. The storage system 21 includes a grid structure of storage cells 25, 26, where each cell is arranged to accommodate a vertical stack of storage bins and having a top level. At least one remotely operated vehicle 27, 27' is arranged to move at the top level of the grid structure and receive a bin from a storage cell at the top level of the grid structure.

The grid structure is in this embodiment divided into two sections A and B, which are separated by thermal insulation 24. The thermal insulation 24 is arranged in a wall between the two sections. Additionally, there is provided thermal insulation between one of the sections, A, and the remotely operated vehicle 27'. The section A can thus have a different temperature than section B and also the remotely operated vehicle.

As seen in FIG. 4, section A is further divided into two sub-sections AA and AB, which also are separated by thermal insulation 24. Both sections AA and AB are connected to a cooling unit 23, such as an evaporator, for lowering the temperature in the storage system sections. In this example, the two sections have different temperature, the temperature of section AA being lower than the temperature of section AB. Section AA may for example have a temperature of 15-20° C. below zero, while section AB may have a temperature of +3-5° C.

The storage system may of course be divided into a different number of sections than is illustrated in this example, having same or different temperatures.

The insulation between the low temperature section A and the remotely operated vehicle means that the vehicle 27' can operate in room temperature in spite of the lower temperature of section A. This is preferable as the performance of the vehicle decreases if the temperature is too low. In particular if the vehicle is battery powered, the operating time of the vehicle is significantly improved in room temperature compared with a cooler temperature.

The vehicles 27, 27', which is arranged to move at the top level of the grid structure, can move freely over the whole top level, ie. over all sections of the grid structure, and also receive a bin from any storage cell at the top level of the grid structure and deliver to a bin lift device as described in FIG. 1.

Figure 5:
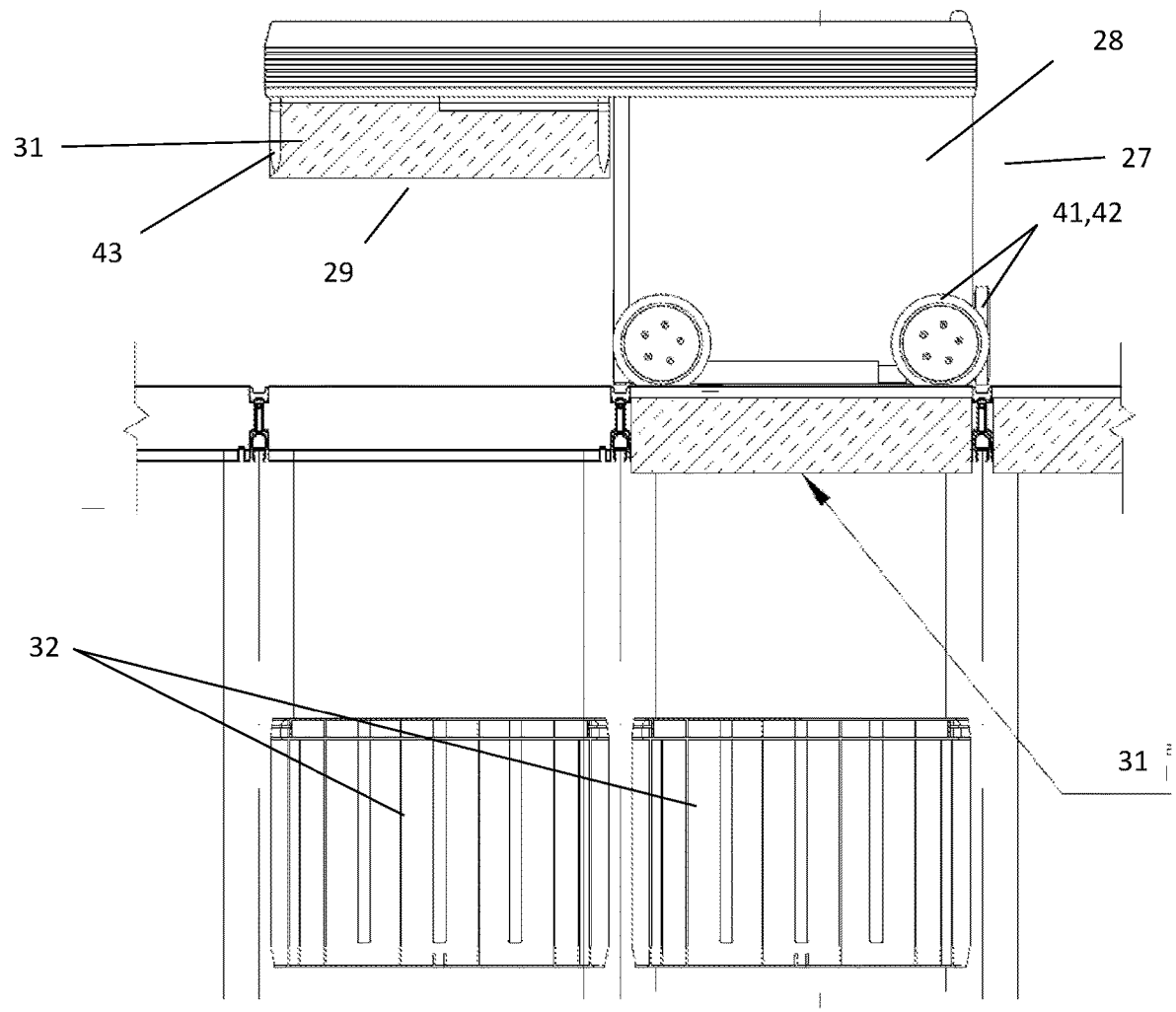
FIG. 5 is a schematic side view illustrating certain aspects of a remotely operated vehicle.

FIG. 5 is a schematic side view illustrating certain aspects of a remotely operated vehicle arranged at the top level of the grid structure, for example as shown in FIGS. 2-4. The thermal insulation between the low temperature section of the grid structure and the remotely operated vehicle 27' comprises a number of insulated covers 31, arranged at each storage cell at the top level of the grid structure storage cell 32 at the top level of the grid structure. The remotely operated vehicle 27' comprises a first section 28 for storing vehicle driving means and a second section 29 for receiving any storage bin stored in a stack within the storage system, a vehicle lifting device 43 at least indirectly connected to the vehicle body for lifting the storage bin into the second section, a first set of vehicle rolling means 41 connected to the vehicle body allowing movement of the vehicle along a first direction within the storage system during use and a second set of vehicle rolling means 42 connected to the vehicle body allowing movement of the vehicle along a second direction in the storage system during use, the second direction being perpendicular to the first direction.

The remotely operated vehicle 27' is arranged to lift the insulated covers 31 and thus giving access to the storage cell 32 below. The storage bin in the storage cell 32 can then be lifted by another remotely operated vehicle, or the remotely operated vehicle 27' may be arranged to be able to lift both the insulated cover and the storage bin. Alternatively, the remotely operated vehicle 27' moves the insulated cover 31 to a neighboring location, and returns to collect the storage bin thus accessible in the storage cell.

After the storage bin 32 has been collected, the vehicle 27 can return the insulated cover to its place, thus ensuring continued insulation of that section of grid structure.

What is claimed is:

1. A storage system comprising:
a grid structure of storage cells, wherein each storage cell is arranged to accommodate a vertical stack of storage bins and having a top level, the grid structure comprises a plurality of vertical aluminum columns interconnected by top rails, the columns forming adjacent rows of storage cells, the grid structure comprises a first section and a second section;
at least one remotely operated vehicle arranged to move on the top rails and receive a storage bin from a storage cell at the top level of the grid structure; and an insulated cover covering at least one of the storage cells at the top level and is movable independently of the storage cells by the at least one remotely operated vehicle.

2. The storage system according to claim 1, wherein the at least one remotely operated vehicle moves between the first and the second section on the top rails.

3. The storage system according to claim 1, wherein the at least one remotely operated vehicle moves the storage bin between a storage cell in the first section of the grid structure to a storage cell of the second section of the grid structure.

4. The storage system according to claim 1, further comprises a thermal barrier having at least a first part accommodated in a row of storage cells arranged between the first and second section.

5. The storage system according to claim 4, wherein the first part of the thermal barrier comprises a wall, boards, plates or mats comprising an insulating material.

6. The storage system according to claim 5, wherein the insulating material is polystyrene.

7. The storage system according to claim 4, wherein the first part of the thermal barrier extends from the floor, upon which the grid structure is arranged, to the top rails.

8. The storage system according to claim 1, wherein the storage cells of the first section and the second section accommodates vertical stacks of storage bins.

9. The storage system according to claim 1, wherein the first section is connected to a cooling unit.

10. The storage system according to claim 1, wherein the second section is connected to a cooling unit.

11. The storage system according to claim 1, wherein the first section is a freezer section and the second section is a cooling section.

12. The storage system according to claim 1, wherein a thermal barrier is provided between at least the first section of the grid structure and the remotely operated vehicle and the first section of the grid structure has a temperature that is lower than the temperature of the remotely operated vehicle.

13. The storage system according to claim 1, wherein the remotely operated vehicle comprises:
 a vehicle body,
 a first vehicle section for storing vehicle driving means,
 a first set of wheels connected to the vehicle body allowing movement of the remotely operated vehicle along a first direction within the storage system during use,
 a second set of wheels connected to the vehicle body allowing movement of the remotely operated vehicle along a second direction in the storage system during use, the second direction being perpendicular to the first direction, and
 a second vehicle section for receiving the storage bin from a stack of storage bins.

14. The storage system according to claim 13, wherein the remotely operated vehicle is arranged to move upon the top rails when the storage bin is in the second vehicle section.

15. The storage system according to claim 13, wherein the remotely operated vehicle has a single vehicle lifting device at least indirectly connected to the vehicle body, the single lifting device is for lifting any of the storage bin and the insulated cover into the second section.

16. The storage system according to claim 1, comprising a plurality of the remotely operated vehicle.

17. A storage system comprising:
 a grid structure of storage cells, wherein each storage cell is arranged to accommodate a vertical stack of storage bins and having a top level, the grid structure comprises a plurality of vertical aluminum columns interconnected by top rails, the columns forming adjacent rows of storage cells;
 at least one remotely operated vehicle arranged to move on the top rails and receive a storage bin from a storage cell at the top level of the grid structure;
 an insulated cover covering at least one of the storage cells at the top level; and
 a thermal barrier having at least a first part accommodated in a row of storage cells arranged between the first and second section,
 wherein the first part of the thermal barrier extends from the floor, upon which the grid structure is arranged, to the top rails.

18. The storage system according to claim 17, wherein the row of storage cells accommodating the first part of the thermal barrier is adjacent to a row of storage cells in the first section and adjacent to a row of storage cells in the second section.

19. The storage system according to claim 17, wherein the row of storage cells accommodating the first part of the thermal barrier is adjacent to a row of storage cells in the first section and adjacent to a row of storage cells in the second section.

\* \* \* \* \*